United States Patent Office 3,349,019
Patented Oct. 24, 1967

3,349,019
PHOTOCHEMICAL PROCESS FOR THE PRODUCTION OF LINEAR TRANSITION METAL COORDINATION POLYMERS FROM METAL CARBONYLS
Harold E. Podall, Alexandria, Va., assignor to Melpar, Inc., Falls Church, Va., a corporation of Delaware
No Drawing. Filed Oct. 14, 1963, Ser. No. 316,170
3 Claims. (Cl. 204—159.11)

This invention relates to the manufacture of inorganic and organo-metallic polymers. More particularly the invention concerns a new and efficient process for the manufacture of useful high temperature stable transition metal containing polymers.

Some procedures for the preparation of certain inorganic and organo-metallic polymers, containing transition metals, have been described in the literature. In general, the transition metal is employed in the form of an appropriate salt, such as the halide, acetate, or acetylacetonate. The other component employed for the polymer preparation is commonly active in hydrogen compound such as dimethylsilanediol, diphenylphosphinic and/or a bis-$\beta$-diketones. Upon mixing, often in the presence of an appropriate base, and in certain cases, upon heating the mixture, the siloxane, diphenylphosphinate or bis-$\beta$-diketones chelate polymer, respectively, containing the transition metal, is produced. In many cases, only partial polymerization occurs to produce a product of low molecular weight. Under more stringent conditions, conducive to more complete reaction crosslinking quite frequently occurs to produce an intractable, brittle solid of relatively low molecular weight. In other cases, the products produced by these methods are simply ionic salts rather than high molecular weight linear polymers. Consequently, there are few, if any, transition metal containing polymers that approach the simple polysiloxanes in commercial value.

Accordingly, it is an object of this invention to provide a new and novel process for the preparation of transition metal containing polymers. A particular object is to provide a procedure whereby these materials are obtained as high molecular weight tractable or soluble polymers. A specific objective is to provide transition metal containing linear polymers of high thermal, oxidative, and hydrolytic stability.

The above and other objects of this invention are achieved by reacting a carbonyl or carbonyl derivative of a transition element of the Periodic Chart of Elements with a difunctional active hydrogen compound, such as diphenylphosphinic acid, diphenylsilanediol, or a bis-$\beta$-diketone, in the presence of ultraviolet radiation, to produce the corresponding poly-metallic-bis-diphenylphosphinate, poly-metallosiloxane, or poly-metallo-bis-$\beta$-diketonate polymer, respectively. The Periodic Chart of Elements referred to above and hereinafter corresponds to the chart given on pages 392 and 393 of the Handbook of Chemistry and Physics, 36th edition (1954–1955), Chemical Rubber Publishing Company. The difunctional active hydrogen compound referred to above and hereinafter refers to a difunctional compound containing one or more hydrogen atoms which are displaceable by sodium, such as described on pages 45 and 46 of Shriner and Fuson, Identification of Organic Compounds, 2nd edition, John Wiley and Sons, Inc., New York (1945). The difunctional character refers to a compound containing either two active hydrogen atoms per molecule, or only one active hydrogen atom plus another reactive site within the molecule that is capable of coordinating to the metal. The other corrdinating reactive site referred to above is most commonly an oxygen, sulfur, nitrogen, or phosphorus atom. Specific examples of such compounds will be evident as the discussion proceeds.

While the benefits of this invention are generally applicable to all transition metal carbonyls, the process is particularly well suited to those of the first row of transition metal elements of the Periodic Chart of Elements, i.e., Sc, Ti, V Cr, Mn, Fe, Co, Ni, Cu, and Zn. Further particular advantage is achieved when the difunctional active hydrogen compound is a phosphinic acid. Thus, one embodiment comprises the reaction of a first row transition metal carbonyl with a phosphinic acid, particularly diphenylphosphinic acid, in the presence of ultraviolet radiation.

When employing the procedure of this invention simultaneous oxidation of the transition metal of the transition metal carbonyl and evolution of carbon monoxide in the presence of ultraviolet radiation under mild reaction conditions is obtained, thus providing an enhancement in yield, faster reaction, and minimization of undesirable untractable by-product polymers. Among further benefits of this invention, it is generally applicable to all of the designated transition metal carbonyls producing useful polymers containing such metals in chemical combination with the active hydrogen compound in higher yield than heretofore attainable and with faster reaction rates. Thus, polymers which previously have not been obtainable or were produced in low yields by the prior art techniques are now provided in high yields suitable for commercialization. It will be noted that the stringent reaction conditions of prior art techniques are not required and the difficulty of producing intractable byproduct polymers is overcome. For example, in the prior art technique employing a transition metal acetylacetonate it is necessary to melt the reactants and heat the mixture above 200° to obtain a product. This operation is not required in the present process since the use of the transition metal carbonyl and ultraviolet light enables the reaction to occur rapidly below 100° C. As a result of these mild conditions, considerably less crosslinking occurs and a useful tractable high molecular weight polymer is obtained. Another particular advantage in the present process is that there is an increase in the oxidation state of the metal as it goes from the carbonyl to the metal containing polymer. This change in oxidation state constitutes a driving force for completion of the reaction. In contrast, with the metal salt reactants of the prior art techniques, the metal undergoes no change in its oxidation state. There is therefor no additional driving force for completion of the reaction. Consequently, the products obtained by the prior art techniques are generally considerably more important and require more elaborate processing to remove the starting materials. A still further advantage in the present process is that many varied derivatives of the metal carbonyl can be employed so as to tailor the resulting polymer by the presence of the functional groups inherent by the use of the respective derivative of the metal carbonyl, Thus, to prepare the novel and new poly-$\pi$-benzene chromium bis-diphenylphosphinate, $\pi$-benzene chromium tricarbonyl and diphenylphosphinic acid are employed. Other advantages of the process of this invention will be evident as the discussion proceeds.

The transistion metal carbonyl derivatives are many and varied. The transition metals include the metals of the first row of transition elements of the Periodic Chart of the Elements (Fisher Scientific Company). The derivatives include both inorganic and organic groups, or ligands, attached to the metal in place of at least one of the carbon monoxide ligands, such that the derivative still contains at least one displaceable carbon monoxide ligand. Typical examples of the inorganic ligands include nitric oxide, ammonia, phosphine, arsine, chlorine, bromine, iodine, thiocyanide, cyanide, and the like ligands of such metals. The organic ligands of these metals include for example, the phosphines, e.g., alkyl, aryl, cycloalkyl, and the like phosphines, the π-arenes, e.g. benzene, toluene, o-xylene, naphthalene, anisole, and the like π-arenes, the π-cyclopentadienyls, e.g., cyclopentadienyl, methylcyclopentadienyl, phenylcyclopentadienyl, and the like π-cyclopentadienyls, the π-dienes, e.g., butadiene, 1,3-cyclohexadiene, allene, isoprene, and the π-dienes. Among the inorganic substituted metal carbonyls employable in the process of this invention are dinitrosylchromium tricarbonyl, triamminochromium tricarbonyl, trisphosphinochromium tricarbonyl, dibromochromium pentacarbonyl, dicyanochromium tetracarbonyl, and the like, where chromium is replaced by other first row transition metals of the Periodic Chart of Elements. Among the organic substituted derivatives of the metal carbonyls employable are included for example bis-acetylacetonatochromium tricarbonyl, bis-triphenyl-phosphine chromium tetracarbonyl, π-cyclopentadienylchromium tricarbonyl dimer, π-benzene chromium tricarbonyl, and the like derivatives of the transition metals described previously.

It is to be understood that all coordination numbers of the metals are intended. For example, the coordination number of chromium in $Cr(CO)_6$ is six, in $$(ON)_2Cr(CO)_3$$

it is five, and in $Cr(NO)_4$ it is four. In general, in the organic type derivatives, the organic portions will contain between 1 to 25 carbon atoms in each radical although higher such groups can be employed.

Such derivatives of the first row transition metals, chromium, manganese, iron, cobalt, and nickel are preferred in the process because of their greater reactivity and economy. The process of this invention is especially well suited to the production of phosphinate polymers of the metals manganese, iron, and nickel which exhibit different problems and are more difficult to prepare. Therefore these metals are especially preferred. Although polymer products of these metals have heretofore been obtained in only low yield and are of low molecular weight, according to the present process, they are readily obtainable in high yield and molecular weight.

For best results, the organic derivatives of the transition metal carbonyls, particularly the π-arenes, are especially preferred. In those instances wherein the starting metal compound is a solid in the reaction mixture, it is generally desirable to employ such materials in finely divided form of the order of about 1000 microns or less.

The difunctional active hydrogen compound employed is one in which the active hydrogen is attached preferably to oxygen, sulfur, nitrogen, or phosphorus. The other functional group may be either another active hydrogen group of the same type, or different, or an atom such as oxygen, sulfur, nitrogen, or phosphorus capable of coordinative bonding to the metal. The following equations exemplify the types of difunctional active hydrogen compounds and the resulting polymer structures that may be prepared by this process.

(a) Doubly bridged polymer from a monobasic acid

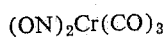

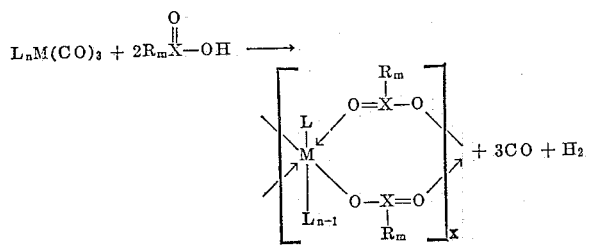

L=CO, NO, π-cyclopentadienyl, π-benzene, etc.
R=an inorganic or organic group.
X=P, S, or Sn preferably.

(b) Doubly bridged polymer from a dibasic acid

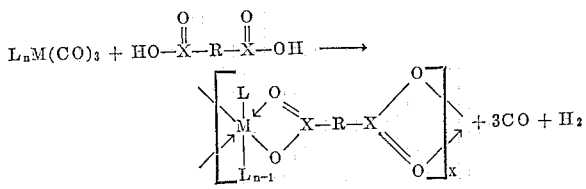

Examples of

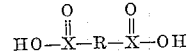

will include various bis-β-diketones where R=alkyl, aryl, cycloalkyl, ferrocenyl, perfluoroalkyl, and the like.

(c) Simple polymers from dibasic acids

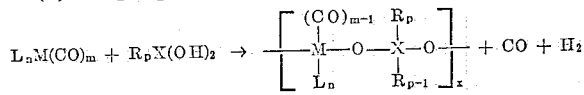

$n=1$ or $2$
$m=$appropriate integer to bring M close to the next inert gas configuration
$p=0$ to $4$ Examples of $R_pX(OH)_2$ include diphenylsilanediol, di-tert-butylstannanediol, phenylboronic acid, and the like.

In general, the process is readily performed by placing the transition metal carbonyl, the difunctional active hydrogen compound, and an inert liquid medium into a reaction vessel, containing an ultraviolet source, in a suitably inert atmosphere. Irradation is begun and the reaction mixture is agitated. In most instances the photochemical reaction of these materials will take place at room temperature although heating is preferred to effect greater reaction rates. At the completion of the reaction, the polymeric product is recovered in a conventional manner such as filtration, or by separation of the byproducts leaving the product in the liquid medium, which can then be recovered by concentration and filtration.

The process of this invention will be more fully understood by reference to the following examples. In all examples, parts and yields are by weight.

*Example I*

To a reactor equipped with external heating means, internal ultraviolet source and agitation, means for refluxing solvent, admitting and discharging reactants and products, is added 1.7 parts of nickel carbonyl and 4.4 parts of diphenylphosphinic acid in 50 parts of benzene under an inert atmosphere of nitrogen. Ultraviolet irradiation is begun and the mixture is heated to reflux for a period of 8 hours. At the end of this period, after cooling to room temperature, the mixture is filtered. An essentially quantitative yield of nickel bis-diphenylphosphinate polymer is obtained.

*Example II*

The procedure of Example I was repeated with the exception that 3.30 parts of chromium carbonyl were reacted with 6.54 parts of diphenylphosphinic acid in 175 parts of refluxing toluene for 72 hours. A waxy green solid product was obtained whose elemental and infrared analysis corresponded to the following structure.

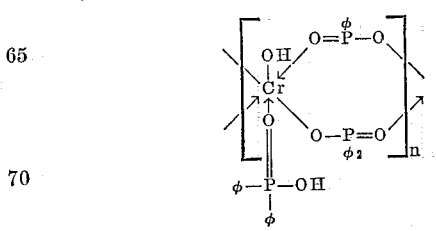

The molecular weight of this product, determined by the osmometric vapor pressure method in chloroform, was 19,000 g./mole. It exhibited no visible change on heating to 360° C. The yield of the chromium polymer was essentially quantitative.

Example III

The procedure of Example I was repeated with the exception that 1.10 parts of chromium carbonyl were reacted with 0.94 part of dimethylphosphinic acid in 150 parts of refluxing benzene for 42 hours. An essentially quantitative yield of the corresponding chromium dimethylphosphinate polymer was obtained. The product was yellow-green in color and exhibited no change on heating to 360° C.

The following example illustrates the importance of employing ultraviolet irradiation.

Example IV

The procedure of Example III was repeated with the exception that no ultraviolet irradiation was employed. Only heat was employed to reflux the reaction mixture. No gas evolution occurred, suggestive of no reaction. In addition, no product could be recovered other than the starting reactants.

Example V

The procedure of Example I was repeated with the exception that 3.9 parts of manganese carbonyl is reacted with 8.7 parts of diphenylphosphinic acid in 175 parts of benzene for 48 hours. An essentially quantitative yield of a snow-white manganese diphenylphosphinate polymer is obtained.

Example VI

The procedure of Example I was repeated with the exception that 1.7 parts of dicobalt octacarbonyl were reacted with 4.36 parts of diphenylphosphinic acid in 150 parts of benzene. The reaction was essentially complete within 5 minutes and a quantitative yield of a bright blue cobalt diphenylphosphinate polymer was thereby obtained.

Example VII

Employing the procedure of Example I, 6.64 parts of bis-triphenylphosphine iron tricarbonyl are reacted with 4.36 parts of diphenylphosphinic acid in 175 parts of refluxing o-xylene for 48 hours. The mixture is then filtered to provide in high yield poly-bis-triphenylphosphine iron bis-diphenylphosphinate.

Example VIII

When 2.58 parts of π-benzene molybdenum tricarbonyl are substituted for the nickel carbonyl in Example I, poly-π-benzene molybdenum bis-diphenylphosphinate is produced in high yield.

Example IX

The procedure of Example I was repeated with the exception that 3.3 parts of chromium carbonyl were reacted with 4.3 parts of phenylsulfinic acid in refluxing benzene for 48 hours. A high yield of poly-chromium monocarbonyl tris-phenylsulfinate was thereby obtained possessing an average molecular weight of 6900 g./mole. The elemental and infrared analysis of this product corresponded to the following structure:

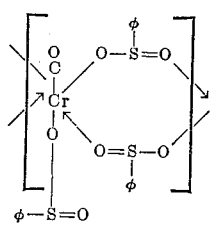

Example X

When 3.66 parts of bis-p-(α-acetylacetonato-) diphenyl ether are substituted for the diphenylphosphinic acid in Example VII, a high yield of the corresponding iron coordination polymer is formed which possesses the following structure:

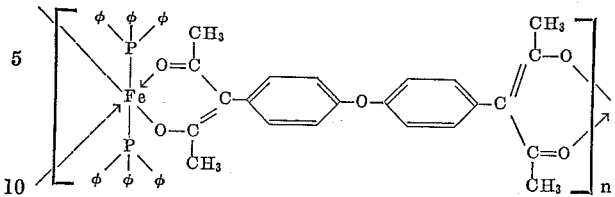

Example XI

Employing the procedure of Example I, 4.68 parts of bis-π-cyclopentadienyltitanium dicarbonyl are reacted with 4.32 parts of diphenylsilanediol in 175 parts of refluxing benzene for 24 hours. Poly-bis-π-cyclopentadienyltitanium diphenylsiloxane is thereby produced in near quantitative yield.

Example XII

In this run, 6.0 parts of tetrakis-trimethoxyphosphine-chromium dicarbonyl are reacted with 1.2 parts of phenylboronic and in 175 parts of refluxing xylene for 72 hours according to the procedure of Example I. A high yield of poly-tetrakis-trimethoxyphosphine chromium phenylboroxine is thereby produced.

Similar results are obtained with other transition metal carbonyls, such as, vanadium hexacarbonyl, iron pentacarbonyl, and tungsten hexacarbonyl. In place of diphenylphosphinic acid in the above examples, one can substitute other phosphorus acids such as dimethylphosphinic acid, phenyl methylphosphinic acid, diphenoxy phosphonic acid, dimethoxyphosphonic acid, methoxymethylphosphonic acid, and the like. Alternately one may employ various alkyl or arylstannoic acids.

Instead of diphenylsilanediol in Example XI, one can substitute dimethylsilanediol, dibenzylsilanediol, methyl phenylsilanediol, di-tert-butylstannanediol, and the like Group IV–A alkyl or arylmetal diols.

Other bis-β-diketones employable in this process instead of bis-p-(α-acetylacetonato) diphenyl ether include 1,5 - bis - α - acetylacetonato-pentane, 1,1' - bis - acetylacetonatoferrocene, 2,4,11,13-tetraketo-tetradecane, and the like.

The wavelengths of ultraviolet irradiation at which the reaction is conducted is in the region of 1000–4000 angstroms, depending upon the metal carbonyl or metal carbonyl derivative employed. In general, ultraviolet irradiation in the near ultraviolet region of 2000–4000 A. is preferred because of the convenience in the use of such ultraviolet light sources.

The temperature at which the reaction is conducted is not critical and generally temperatures between 80° to 350° C. are employed. In general, the higher the temperature the faster the reaction rate. However, as the temperature increases, particularly during the initial stages of the reaction, the number of chains increases and the molecular weight of the resulting polymer decreases. Accordingly to achieve optimum results it is preferred to operate at temperatures ranging between 25–150° C., depending upon the reactants employed.

The time of the reaction will likewise depend somewhat upon the other conditions under which the reaction is conducted although times between 1 minute to 100 hours are generally quite adequate. In order to minimize side effects it is preferred to conduct the reaction for a period from 10 minutes to 6 hours.

The proportion of the reactants employed is between one mole to three moles of the active hydrogen compound per mole of the metal carbonyl depending upon the composition of the polymer of interest. In general, stoichiometric quantities of the reactants are employed to maximize the molecular weight of the polymer.

The prime function of the organic diluent employed is to facilitate contact of the reactants under the influence of ultraviolet irradiation. In general, they should be inert to the reactants and essentially transparent to the particular ultraviolet wavelengths requisite for effecting reaction between the reactants. Furthermore, it is desirable that they exhibit solubility for at least the metal carbonyl and preferably for both of the reactants. Among such organic diluents which can be employed are included the hydrocarbons, ethers, and amines. Among the hydrocarbons included are, for example, nonanes, octadecanes, hexanes, toluene, benzene, xylene, mesitylene, and mixed hydrocarbons such as gasoline, diesel oil and the like petroleum fractions. Among the ethers employed are included for example the non-aromatics, aromatics, and polyethers including, for example, di-ethyl ether, di-isopropyl ether, di-n-butyl ether, ethyl isoamyl ether, methyl phenyl ether (anisole), tetraethylene glycol dimethyl ether, and the dimethyl, diethyl and di-n-butyl ethers of diethylene glycol. Among the amines which are employable are included for example the non-aromatics, aromatics, and polyamines including, for example, diethyl amine, dioctyl amine, methyl ethyl amine, diphenyl amine, pyridine, o-methylpyridine, 2,6-dimethylpyridine, isoquinoline, triethyl amine, tributyl amine, ethylene diamine, 1,2-propylenediamine, and the like.

The coordinating solvents, especially the amines, are particularly preferred since these materials exhibit a reaction promoting effect. In certain instances, there may be incorporated into the polymer, with beneficial effects, as a monodentate, bidentate, or tridentate ligand.

The process provides products which are of considerable use. These products can be, for example, cast into thermally stable coatings for the encapsulation of electronic components. Another particular use for the polymeric products produced according to the process of this invention is in the fabrication of molded articles and parts used in the construction of ultrasonic aircraft, rockets, and nuclear aircraft. For example, the manganese diphenylphosphinate polymers may be used in rockets to withstand temperatures up to 500° C. for significant periods of time. These and other uses will be evident to those skilled in the art of polymer technology.

Having thus described the process of this invention it is not intended that it be limited except as set forth in the following claims.

We claim:
1. The process of making a transition metal containing polymer which comprises reacting a transition metal carbonyl derivative with a difunctional active hydrogen compound in the presence of ultraviolet irradiation at a temperature in the range of from approximately 25° C. to 150° C.; wherein said derivative is a transition metal carbonyl having an organic or inorganic ligand attached to the metal in place of one or more of the carbon monoxide ligands and having at least one carbon monoxide ligand which remains attached to the metal, the difunctional hydrogen compound being a member selected from the group consisting of: phosphinic acids, sulfinic acids, stannoic acids, boronic acids, silanediols, and bis-β-diketones.

2. The process according to claim 1 wherein the solvent is inert.

3. The process according to claim 1 wherein the solvent is a coordinating solvent which is incorporated as a monodentate, bidentate, or tridentate ligand in the resulting polymer.

References Cited

UNITED STATES PATENTS 3,097,153  7/1963  Hubel et al. _____ 204—158

FOREIGN PATENTS 939,191  10/1961  Great Britain.

OTHER REFERENCES

Podall et al., "A Novel Synthesis of Transition Metal Coordination Polymers" J. of Polymer Science vol. 1, No. 9 pp. 457–459 (1963) Part B Polymer Letters.

Block et al., J. Am. Chem. Soc. 84 page 1749 (1962).

MURRAY TILLMAN, *Primary Examiner.*

R. B. TURER, N. FOBLON, *Assistant Examiners.*